United States Patent Office 3,407,782
Patented Oct. 29, 1968

3,407,782
APPARATUS FOR SPREADING BUTTER AND LIKE SUBSTANCES ON BREAD SLICES AND LIKE-SHAPED ARTICLES
Joseph Medley, 6 Llantarnam Close, Cwmbran, Monmouthshire, Wales
Filed Aug. 31, 1966, Ser. No. 576,452
7 Claims. (Cl. 118—13)

ABSTRACT OF THE DISCLOSURE

The disclosure relates to apparatus for spreading butter or the like upon a slice of bread or like-shaped articles. The apparatus includes a magazine for holding a quantity of butter or like substance, a plunger in the magazine for extruding the butter through discharge openings, a roller which faces the openings in the magazine and is arranged to receive the extruded butter together with a means for moving a slice of bread or the like relative to the roller so as to cause the butter or like substance to be spread upon the bread.

---

This invention relates to apparatus for spreading butter and like substances on a slice of bread or like-shaped article.

It is an object of the invention to provide apparatus suitable for use, for example, in canteens which will facilitate the spreading of butter and like substances on bread and like slices.

It is a further object of the invention to provide apparatus for spreading butter and like substances on bread and like slices which is capable of dealing successively with large quantities of slices.

It is a further object of the invention to provide apparatus which is readily adjustable to vary the rate at which the substance is spread on the articles.

According to the invention, apparatus for spreading butter and like substances on slices of bread and like-shaped articles comprises a magazine arranged to contain a substance to be spread and having a surface provided with discharge openings, a plunger movable in the magazine in a direction to cause the substance to be extruded from the magazine through the said discharge openings, article-advancing means including a roller facing the said magazine surface and arranged to receive the extruded surface, means for driving the article-advancing means and means for moving the plunger to cause the substance to be extruded on to the said roller, the article-advancing means providing two surfaces adapted to engage opposite sides of the article of which sides one engages the substance-carrying surface of the roller to receive the substance therefrom.

Figure 1:
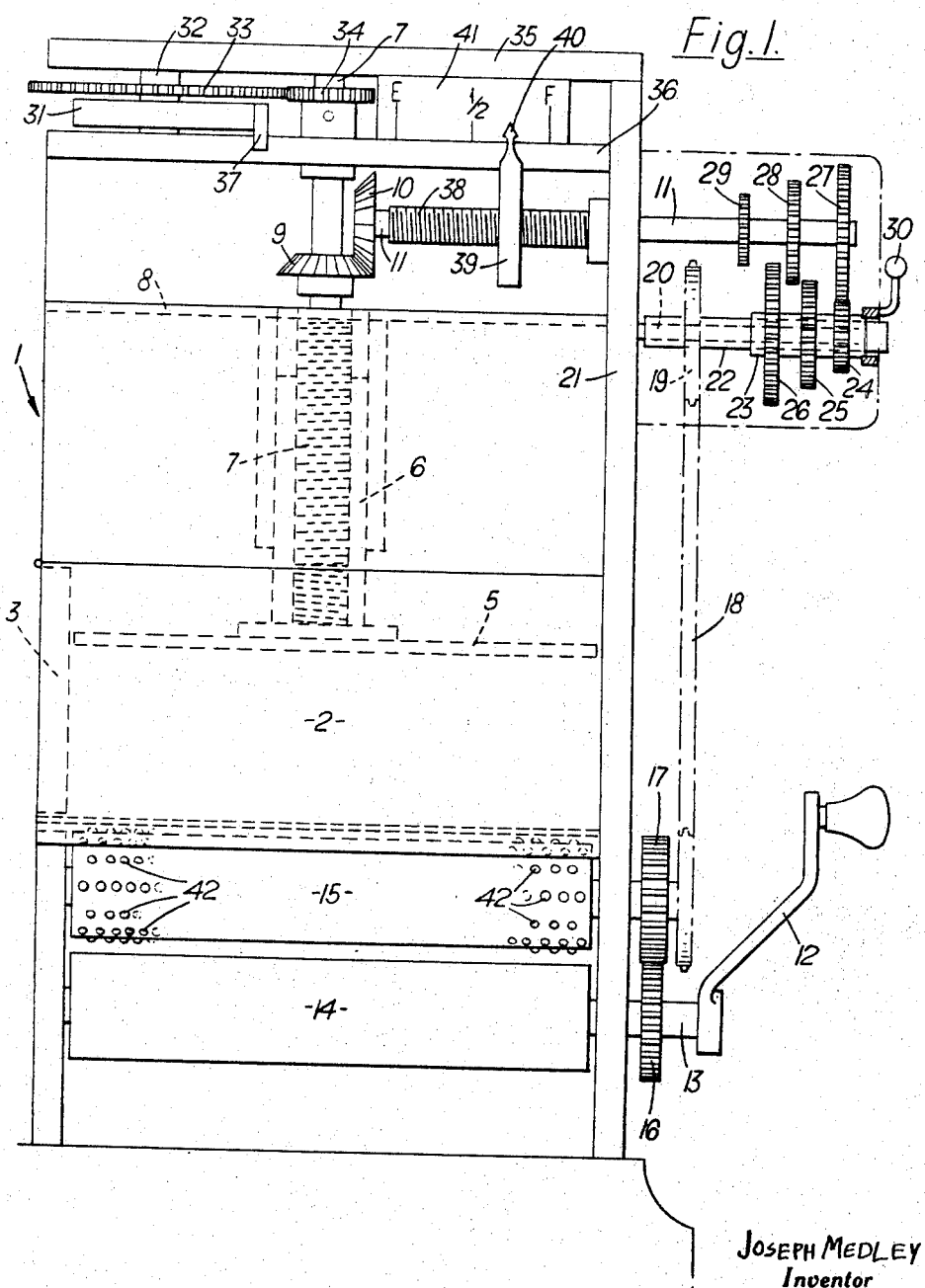
Figure 2:
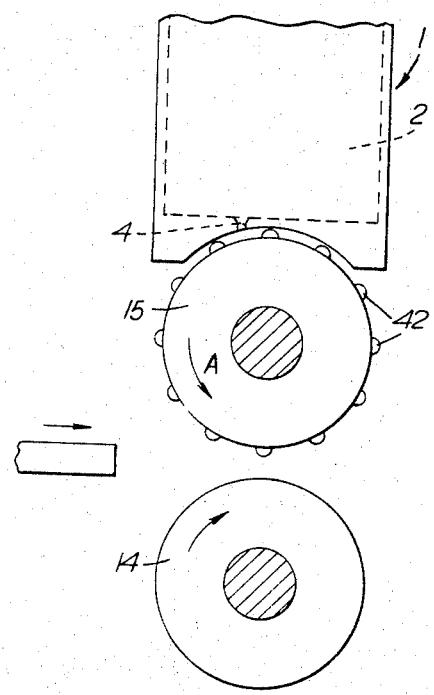

The invention is illustrated by way of example in the accompanying diagrammatic drawings which show a machine for spreading butter on bread slices and in which:

FIG. 1 is a front elevation; and
FIG. 2 is a part sectional side elevation.

Referring to the accompanying drawings, a housing 1 encloses, at its lower part, a magazine 2 which is closable by a door 3 hinged to a side of the housing. The magazine is arranged to receive a block of butter, for example a half pound block of conventional shape and dimensions. The bottom of the magazine is closed by a base having a single row of perforations 4. A plunger 5 is vertically reciprocable in the magazine and extends closely adjacent to the upright sides thereof. The plunger 5 carries, on its upper surfaces, a nonrotatable nut 6 in which a screw-threaded rod 7 is engaged, the arrangement being such that rotation of the rod causes the plunger to be reciprocated vertically in the magazine. Downward movement of the plunger causes butter placed below it in the magazine to be forced through the perforations 4 in the bottom of the magazine. The nut has a shank which is long enough to enable the plunger to be moved downwards to a desired lowest position while the shank is maintained in engagement in the nut. The rod 7 passes through a horizontal guide 8, which may be a solid plate or spider, which extends, above the magazine, between the sides of the housing. The upper end of the rod carries a bevel wheel 9 which meshes with a similar wheel 10 on a shaft 11 adapted to be rotated manually. This manual rotation is effected by a crank-handle 12 which is carried by the spindle 13 of the lower of a pair of rubber-covered rollers 14 and 15 disposed below the bottom of the magazine, the upper 15 of the rollers being disposed to receive butter extruded through the perforations 4. Toothed wheels 16 and 17 on the roller spindles cause the rollers to rotate together while a driving chain 18 is used to transmit the motion of the upper roller 15 to the shaft 11 which carries the wheel 10. The perforations 4 are spaced along a line displaced from a plane containing the axes of the rollers 14 and 15 and located on the side of this plane at which a bread slice is admitted to the rollers, the upper of which rotates in the direction shown by the arrow A in FIG. 2.

The chain 18 engages a sprocket wheel 19 which is carried by a shaft 20 fixed on a member 21 rigid with the housing 1. The sprocket wheel is rigid with a sleeve 22 which is rotatable on the shaft 20. Keyed to the sleeve 22 is a further sleeve 23 which is rigid with toothed wheels 24, 25 and 26 which are adapted to mesh, in turn, with toothed wheels 27, 28 and 29 as a handle 30 is used to move the sleeve 23. The wheels 24 to 29 are spaced so that only one of the wheels 24, 25 and 26 can mesh, at a time, with one of the wheels 27, 28 and 29. The wheels and the sleeve 23 form a variable speed transmission gear having a neutral position which is reached by moving the handle 30 to the left as seen in FIG. 1.

When the crank-handle is rotated in a direction to move the plunger 5 downwards in the magazine, a spring 31 is charged upon rotation of a spindle 32 which carries a toothed wheel 33. This wheel 33 meshes with a toothed wheel 34 which is carried by an upward continuation of the shaft 7 so that rotation of this shaft is accompanied by rotation of the spindle 32. A fixed upper frame member 35 provides bearings for the spindle 32 and for the upper end of the shaft 7. A further frame member 36 provides another bearing for the spindle 32 and carries a stop 37 to which one end of the spring 31 is fixed. It will be appreciated that, when the variable speed transmission gearing is in its neutral position, the spring 31 is free to rotate the shaft 7 in a direction to raise the plunger 5 to its upper end position.

A sleeve 38 having a fine screwthread on its outer surface is carried by the spindle 11 to rotate therewith. A disc 39 is nonrotatably mounted on the sleeve 38 and carries a pointer 40 which is movable along a scale 41 as the spindle 11 rotates. The scale is calibrated in terms of the position of the plunger 5 in the magazine 2.

Adjustment of the rate of movement of the plunger 5 in relation to the rate of rotation of the roller 14 and 15 enables the rate of discharge of butter on to the roller 15 to be adjusted.

As shown in FIG. 2, the surface of the magazine which faces the roller 15 is made concave, the curvature of this surface conforming with the curvature of the peripheral surface of the roller. Projections 42 on the roller 15 are arranged lightly to brush the adjacent surface of the magazine.

A table, not shown, may be disposed with its upper surface in the same place as the top of the lower roller 14.

The spindle 13 may be driven mechanically for example by an electric motor.

I claim:

1. Apparatus for spreading butter and like substances on slices of bread and like-shaped articles which comprises a magazine arranged to contain a substance to be spread and having a surface provided with discharge openings, a plunger movable in the magazine in a direction to cause the substance to be extruded from the magazine through the said discharge openings, article-advancing means including a roller facing the said magazine surface and arranged to receive the extruded substance, means for driving the article-advancing means, and means operable in response to operation of said driving means for moving the plunger to cause the substance to be extruded on to the said roller, the article-advancing means providing two surfaces adapted to engage opposite sides of the article of which sides one engages the substance-carrying surface of the roller to receive a substance therefrom.

2. Apparatus as claimed in claim 1 wherein the said magazine surface is concave and the discharge openings extend in a line parallel with the axis of the roller.

3. Apparatus as claimed in claim 1 wherein the said surface of the magazine is concave and the peripheral surface of the roller is provided with projections arranged to brush the said surface.

4. Apparatus as claimed in claim 1 in which said means for moving said plunger comprises change-speed transmission mechanism arranged to vary the relation between the rates of motion of the article-advancing means and the linear motion of the plunger.

5. Apparatus as claimed in claim 1 which comprises a spindle drivingly connected with the plunger, and change-speed gear mechanism drivingly connected with said spindle, the said mechanism having a neutral gear position arranged to enable the plunger to be moved idly to a position remote from the said surface of the magazine.

6. Apparatus as claimed in claim 1 which comprises a spindle drivingly connected with the plunger, change-speed gear mechanism drivingly connected with said spindle and having a neutral gear portion and an energy-storage means arranged to be charged during movement of the plunger towards the said surface of the magazine and to release its stored energy to retract the plunger when the said gear mechanism occupies its neutral position.

7. Apparatus as claimed in claim 1 having plunger driving mechanism which comprises a spindle, a pointer movable on the spindle and a fixed scale arranged to be traversed by the pointer to indicate the position of the plunger.

References Cited

UNITED STATES PATENTS

| | | | |
|---|---|---|---|
| 826,897 | 7/1906 | Shely | 118—259 X |
| 866,949 | 9/1907 | Merrick | 103—211 |
| 1,838,112 | 12/1931 | Rundell | 118—259 X |
| 2,182,068 | 12/1939 | Clark | 118—13 |
| 2,946,486 | 7/1960 | Gilmont | 222—390 X |
| 2,956,511 | 10/1960 | Morehead | 103—211 |
| 3,063,411 | 11/1962 | Phillips et al. | 118—259 X |

FOREIGN PATENTS

| | | |
|---|---|---|
| Ad. 1,518 | 1895 | Great Britain. |
| 24,552 | 5/1919 | Denmark. |

CHARLES A. WILLMUTH, *Primary Examiner.*

JOHN P. McINTOSH, *Assistant Examiner.*